United States Patent
Wang

(10) Patent No.: US 12,110,440 B1
(45) Date of Patent: Oct. 8, 2024

(54) SILICON-BASED CURED FOAM MATERIAL FOR RAPIDLY BLOCKING FOREST FIRE, AND PREPARATION METHOD AND USE THEREOF

(71) Applicant: TIANJIN FIRE SCIENCE AND TECHNOLOGY RESEARCH INSTITUTE OF MEM, Tianjin (CN)

(72) Inventor: Pengfei Wang, Tianjin (CN)

(73) Assignee: TIANJIN FIRE SCIENCE AND TECHNOLOGY RESEARCH INSTITUTE OF MEM, Tianjin (CN)

( * ) Notice: Subject to any disclaimer, the term of this patent is extended or adjusted under 35 U.S.C. 154(b) by 0 days.

(21) Appl. No.: 18/739,784

(22) Filed: Jun. 11, 2024

Related U.S. Application Data

(63) Continuation of application No. PCT/CN2023/113472, filed on Aug. 17, 2023.

(30) Foreign Application Priority Data

Nov. 16, 2022 (CN) .......................... 202211432520.0

(51) Int. Cl.
  *C09K 21/02* (2006.01)
  *A62C 3/02* (2006.01)
  *A62C 5/02* (2006.01)

(52) U.S. Cl.
  CPC ................ *C09K 21/02* (2013.01); *A62C 3/02* (2013.01); *A62C 5/02* (2013.01)

(58) Field of Classification Search
  CPC .............. C09K 21/04; A62C 3/02; A62C 5/02
  See application file for complete search history.

(56) References Cited

U.S. PATENT DOCUMENTS

| | | | |
|---|---|---|---|
| 7,994,218 B2 | 8/2011 | Jandeleit et al. | |
| 9,133,581 B2 | 9/2015 | Devenney et al. | |
| 9,512,545 B2 | 12/2016 | Zhang et al. | |

FOREIGN PATENT DOCUMENTS

| | | |
|---|---|---|
| CN | 102319499 A | 1/2012 |
| CN | 111075499 A | 4/2020 |
| CN | 111111080 A | 5/2020 |
| CN | 115678575 A | 2/2023 |

OTHER PUBLICATIONS

Zhang Lianchao et al., Shandong Chemical Industry, Effect of Surfactant Compound System on Extinguishing Performance of Foam Extinguishing Agent, Mar. 8, 2020, pp. 31, vol. 49, Issue 5.

*Primary Examiner* — Peter F Godenschwager

(57) ABSTRACT

A silicon-based cured foam material for rapidly blocking a forest fire includes: a binder, a foaming agent, a coagulant, an aggregate, and water, where when the water is in 100 parts by mass, the binder is in 4.5 parts to 6 parts by mass, the foaming agent is in 0.9 parts to 1.2 parts by mass, and the coagulant is in 7.5 parts to 10 parts by mass; a mass ratio of the aggregate to the water is 1:(10-20); and the foaming agent is a mixture of sodium dodecyl sulfate and dodecyl dimethyl betaine or a mixture of tetradecyl dimethyl benzyl ammonium chloride and dodecyl dimethyl betaine. The silicon-based cured foam material has a high viscosity and excellent elasticity due to gelation properties. And because solid particles are attached to bubble walls, a particle-containing covering layer can still be formed after bubble bursting to isolate a vegetation from oxygen.

2 Claims, 12 Drawing Sheets

SILICON-BASED CURED FOAM MATERIAL FOR RAPIDLY BLOCKING FOREST FIRE, AND PREPARATION METHOD AND USE THEREOF

CROSS-REFERENCE TO RELATED APPLICATIONS

This application is a continuation of International Patent Application No. PCT/CN2023/113472 with a filing date of Aug. 17, 2023, designating the United States, now pending, and further claims priority to Chinese Patent Application No. 202211432520.0 with a filing date of Nov. 16, 2022. The content of the aforementioned applications, including any intervening amendments thereto, are incorporated herein by reference.

TECHNICAL FIELD

The present disclosure relates to the technical field of fire protection, and specifically relates to a silicon-based cured foam material for rapidly blocking a forest fire, and a preparation method and use thereof.

BACKGROUND

In recent years, forest fire accidents have frequently occurred worldwide, causing great hazards to the safety of human lives and properties and the ecological environments. Forest fires have characteristics such as strong suddenness, rapid spread, large destructiveness, and wide impact range. If a forest fire cannot be blocked in time, it will often cause an immeasurable loss.

A forest fire isolation belt can divide a forest into small blocks to effectively inhibit the spread of a forest fire, and plays an irreplaceable role in the prevention and extinguishing of a forest fire. The establishment of a forest fire isolation belt can control an amount of combustibles, and is an effective means to prevent the spread of a fire. The traditional manual cutting, tractor-ploughing, and fire burning methods for building fire isolation belts have disadvantages such as large workload, poor timeliness, and high cost. The use of explosive blasting to build a fire isolation belt has disadvantages such as high labor intensity, low efficiency, and high risk. Spraying a fire-retardant material directly on a ground or a tree crown of an unburned forest region is a method to quickly build a forest fire isolation belt, and can effectively prevent the spread of a forest fire. The current materials used in relevant technologies to build forest fire isolation belts mainly include natural water, dry powders, foams, and gels. Natural water is not easy to stay on a surface of a forest vegetation due to small adhesion and large fluidity, and thus can hardly play a role of blocking a crown fire. Dry powder materials have an excellent blocking effect, but exhibit shortcomings such as heavy pollution, unavailable remote spraying, and easy re-ignition. Water-based foams have shortcomings such as fast bubble bursting, no solid components, too-small specific gravity, low viscosity, poor adhesion, and uneasy accumulation on a surface of a forest vegetation. Three-phase foams cannot block a forest fire for a long time due to no solidification, insufficient water-holding capacity, and no viscosity after bubble bursting. Gel materials have disadvantages such as complicated preparation process, expensive raw materials, and uneasy dissolution, which limit the application of gel materials in rapid forest fire isolation.

SUMMARY OF PRESENT INVENTION

The present disclosure is intended to at least solve one of the technical problems in the prior art to some extent. In view of this, the embodiments of the present disclosure provide a silicon-based cured foam material for rapidly blocking a forest fire, and a preparation method and use thereof. In the embodiment of the present disclosure, different foaming agents are combined to increase foam expansion ratios of each single foaming agent and prolong a foam half-life, such that a cured foam material with excellent foaming and foam-stabilizing performance can be prepared. In addition, an aggregate is added at an appropriate concentration to improve the stability and burning resistance of the foam. Therefore, the silicon-based cured foam material of the present disclosure can adhere to a surface of a forest vegetation for a long time after being sprayed to significantly reduce a temperature of a fire source, and a solid particle-containing covering layer can still be formed after bubble bursting to isolate oxygen and allow uneasy re-ignition.

An embodiment of the present disclosure provides a silicon-based cured foam material, including: a binder, a foaming agent, a coagulant, an aggregate, and water, where when the water is in 100 parts by mass, the binder is in 4.5 parts by mass to 6 parts by mass, the foaming agent is in 0.9 part by mass to 1.2 parts by mass, and the coagulant is in 7.5 parts by mass to 10 parts by mass; a mass ratio of the aggregate to the water is 1:(10-20); and the foaming agent is a mixture of sodium dodecyl sulfate and dodecyl dimethyl betaine or a mixture of tetradecyl dimethyl benzyl ammonium chloride and dodecyl dimethyl betaine.

In some embodiments, the foaming agent is a mixture of sodium dodecyl sulfate and dodecyl dimethyl betaine in a mass ratio of 8:2.

In some embodiments, the foaming agent is a mixture of tetradecyl dimethyl benzyl ammonium chloride and dodecyl dimethyl betaine in a mass ratio of 6:4.

In some embodiments, the binder is an inorganic silicate.

In some embodiments, the binder is at least one selected from the group consisting of sodium silicate, lithium silicate, potassium silicate, and ammonium silicate.

In some embodiments, the binder is preferably sodium silicate (water glass).

In some embodiments, the coagulant is sodium dihydrogen phosphate.

In some embodiments, the aggregate is at least one selected from the group consisting of a fly ash, nano-silica, and a quartz powder.

An embodiment of the present disclosure also provides a preparation method of the silicon-based cured foam material, including the following steps:

(1) dissolving the foaming agent, the binder, and the coagulant separately in the water to obtain a foaming agent solution, a binder solution, and an coagulant solution, respectively;

(2) pouring the foaming agent solution, the binder solution, and the coagulant solution obtained in the step (1) into a stirrer, and adding the aggregate to the stirrer to obtain a mixed solution; and (3) foaming the mixed solution through a combination of mechanical stirring and gas injection.

In some embodiments, a gas adopted in the step (3) is air.

An embodiment of the present disclosure also provides a use of the silicon-based cured foam material as a material for blocking a forest fire.

The present disclosure has the following advantages and beneficial effects:

(1) The raw materials used in the present disclosure are inexpensive, easily-available, and non-toxic, can be easily dissolved, and do not include an insoluble polymer gel. The preparation method of the present disclosure is simple, involves convenient operations, and does not lead to the production of toxic substances. The curing system used in the present disclosure is an inorganic salt with high solubility.

(2) When the foaming agent is a mixture of sodium dodecyl sulfate and dodecyl dimethyl betaine, the sodium dodecyl sulfate and the dodecyl dimethyl betaine play a synergistic role and allow a higher foam expansion ratio than a single foaming agent.

When the foaming agent is a mixture of tetradecyl dimethyl benzyl ammonium chloride and dodecyl dimethyl betaine, a foam produced exhibits characteristics such as high viscosity and uneasy bursting, and has a foam half-life as long as 3 d or more.

(3) The gelation and curing system used in the present disclosure has a prominent curing effect and allows a controllable curing time. A curing time of a foam can be adjusted in a range of 1 min to 10 min by adjusting a ratio of the binder to the coagulant and concentrations of the binder and the coagulant.

(4) The silicon-based cured foam material in the embodiment of the present disclosure has an excellent water-holding capacity and high stability. In contrast to a water-based foam, a continuous outer phase in the silicon-based cured foam material is a gel, and the gel can ensure excellent coverage performance and can continue to play a covering role after bubble bursting, which ensures the durability and effectiveness of flame retardancy. In contrast to a three-phase foam, a gelation system is added in the silicon-based cured foam material, and the gelation system can be cured in a short time to increase a foam strength and play a foam-stabilizing role. In contrast to an inorganic hydrogel and a polymer gel, there is a large amount of a gas evenly distributed in the gel of the silicon-based cured foam material, which greatly improves the fluidity of the gel, allows a high foam expansion ratio, and greatly reduces a cost of the silicon-based cured foam material per unit volume.

(5) The silicon-based cured foam material in the embodiment of the present disclosure has a prominent inhibition and cooling effect. During a practical application, the silicon-based cured foam material at a high flow rate can quickly cover a surface of a vegetation to play an excellent role in cooling and oxygen isolation and effectively isolate a fire zone. It is determined by a combustion experiment that the silicon-based cured foam material has a very prominent inhibition and cooling effect. Even after water in the silicon-based cured foam material is evaporated to cause bubble bursting, because the aggregate adheres to bubble walls to support a skeleton, a particle-containing covering layer can still be formed to isolate a vegetation from oxygen. In addition, the silicon-based cured foam material has characteristics such as high mechanical strength, small filtration loss, and small damage to a ground.

BRIEF DESCRIPTION OF THE DRAWINGS

The above and/or additional aspects and advantages of the present disclosure will become apparent and easily understandable from the following descriptions of the embodiments with reference to the accompanying drawings.

DETAILED DESCRIPTION OF THE EMBODIMENTS

Figure 1:
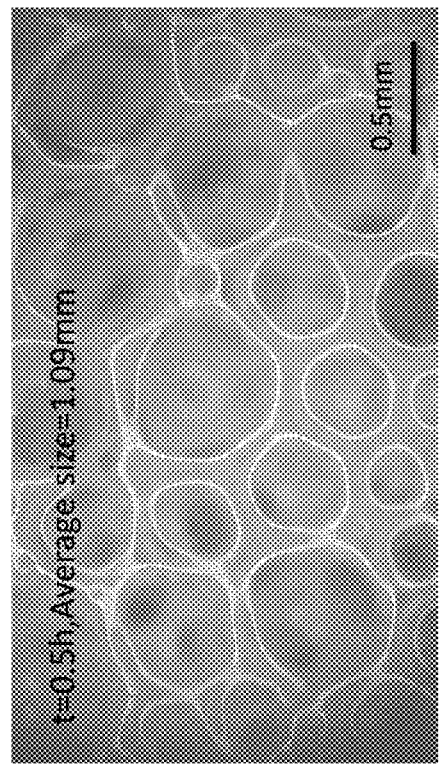
FIG. 1 shows a size change of a water-based foam produced when a foaming agent alone is added.
Figure 1:
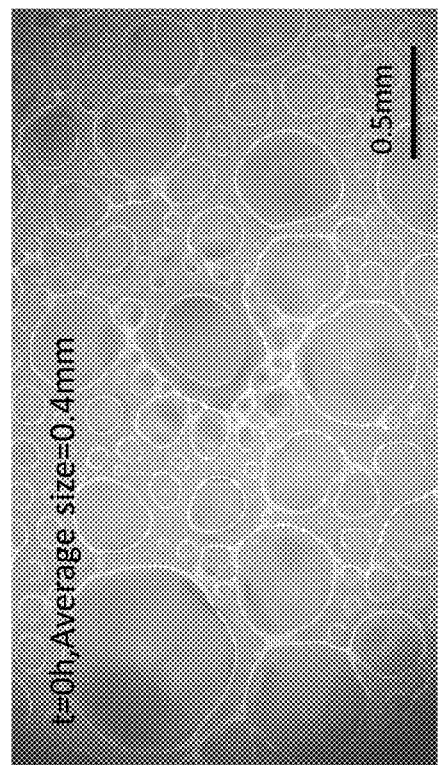

The embodiments of the present disclosure are described in detail below. The embodiments described below with reference to the accompanying drawings are illustrative, and are intended to explain the present disclosure rather than to limit the present disclosure.

The silicon-based cured foam material is an inorganic composite material, and can be prepared by a simple preparation process with raw materials that are easily available and dissoluble. The silicon-based cured foam material can be cured in a short time, and thus can quickly form a flame-retardant layer on a surface of a forest vegetation to produce a large-area fire isolation belt in a short time. This method has the advantage of very strong timeliness. The silicon-based cured foam material can be arranged in a large area in a short time, which saves a lot of labor. Thus, the silicon-based cured foam material is very suitable for emergent establishment of a fire isolation belt when a forest fire threatens the safety of a residential building. Relying on a special three-dimensional crosslinked structure, the silicon-based cured foam material can fix a large amount of water for a long time, and firmly adhere to a surface of a vegetation. After the silicon-based cured foam material undergoes combustion and dehydration, a silicon-based amorphous flame-retardant layer can be formed to effectively prevent the spread of a fire. In addition, the silicon-based cured foam material includes a phosphate group, and thus when the silicon-based cured foam material is decomposed at a high temperature, a viscous protective film bonded through silicon-oxygen-phosphorus bonding can be formed to avoid a contact between combustibles and oxygen, thereby further preventing the combustibles from combusting. Therefore, the development of a novel silicon-based cured foam material for rapidly blocking the spread of a forest fire is of great significance.

In view of this, an embodiment of the present disclosure provides a silicon-based cured foam material, including: a binder, a foaming agent, a coagulant, an aggregate, and water, where when the water is in 100 parts by mass, the binder is in 4.5 parts by mass to 6 parts by mass, the foaming agent is in 0.9 part by mass to 1.2 parts by mass, and the coagulant is in 7.5 parts by mass to 10 parts by mass; a mass ratio of the aggregate to the water is 1:(10-20); and the foaming agent is a mixture of sodium dodecyl sulfate and dodecyl dimethyl betaine or a mixture of tetradecyl dimethyl benzyl ammonium chloride and dodecyl dimethyl betaine.

For example, when the water is in 100 parts by mass, the binder can be in 4.5 parts by mass, 4.8 parts by mass, 5 parts by mass, 5.2 parts by mass, 5.5 parts by mass, 6 parts by mass, or the like, the foaming agent can be in 0.9 part by mass, 1.0 part by mass, 1.05 parts by mass, 1.1 parts by mass, 1.15 parts by mass, 1.2 parts by mass, or the like, and the coagulant can be in 7.5 parts by mass, 8 parts by mass, 8.5 parts by mass, 9 parts by mass, 9.5 parts by mass, 10 parts by mass, or the like; and a mass ratio of the aggregate to the water can be 1:10, 1:12, 1:14, 1:15, 1:18, 1:20, or the like.

The silicon-based cured foam material produced in the embodiment of the present disclosure has a high viscosity and excellent elasticity due to gelation properties. In addition, because solid particles are attached to bubble walls to support a skeleton, a particle-containing covering layer can still be formed after bubble bursting to isolate a vegetation from oxygen, thereby preventing combustibles from combusting.

In some embodiments, the foaming agent is a mixture of sodium dodecyl sulfate and dodecyl dimethyl betaine in a mass ratio of 8:2.

In some embodiments, the foaming agent is a mixture of tetradecyl dimethyl benzyl ammonium chloride and dodecyl dimethyl betaine in a mass ratio of 6:4.

In some embodiments, the binder is an inorganic silicate.

In some embodiments, the binder is at least one selected from the group consisting of sodium silicate, lithium silicate, potassium silicate, and ammonium silicate. For example, the binder may be sodium silicate, lithium silicate, potassium silicate, ammonium silicate, a mixture of sodium silicate and lithium silicate, a mixture of sodium silicate and potassium silicate, or a mixture of sodium silicate, lithium silicate, and ammonium silicate.

In some embodiments, the binder is preferably sodium silicate (water glass).

In some embodiments, the coagulant is sodium dihydrogen phosphate.

In some embodiments, the aggregate is at least one selected from the group consisting of a fly ash, nano-silica, and a quartz powder. For example, the aggregate may be a fly ash, nano-silica, a quartz powder, a mixture of a fly ash and nano-silica, a mixture of a fly ash and a quartz powder, or a mixture of a fly ash, nano-silica, and a quartz powder.

An embodiment of the present disclosure also provides a preparation method of the silicon-based cured foam material, including the following steps:

(1) the foaming agent, the binder, and the coagulant are dissolved separately in the water to obtain a foaming agent solution, a binder solution, and a coagulant solution, respectively;

(2) the foaming agent solution, the binder solution, and the coagulant solution obtained in the step (1) are poured into a stirrer, and the aggregate is added to the stirrer to obtain a mixed solution; and (3) the mixed solution is foamed through a combination of mechanical stirring and gas injection.

In some embodiments, a gas adopted in the step (3) is air.

In some embodiments, the mechanical stirring in the step (3) is conducted at a rotational speed of greater than 100 r/min, such as 100 r/min to 1,000 r/min. In a specific embodiment, the rotational speed for the mechanical stirring can be 100 r/min, 150 r/min, 200 r/min, 300 r/min, 500 r/min, 800 r/min, 1,000 r/min, or the like.

In some embodiments, a gas/liquid mixing ratio (a volume ratio) in the step (3) is (5-20): 1. For example, the gas/liquid mixing ratio can be 5:1, 8:1, 10:1, 15:1, 20:1, or the like.

An embodiment of the present disclosure also provides a use of the silicon-based cured foam material as a material for blocking a forest fire.

It should be noted that:

Unless otherwise specified, all experimental methods used in the embodiments of the present disclosure are conventional methods.

All materials and reagents used in the embodiments of the present disclosure may be commercially available, unless otherwise specified.

In the embodiments of the present disclosure, unless otherwise specified, the parts involved refer to parts by mass. In the embodiments of the present disclosure, in the step (3), the rotational speed for the mechanical stirring is 100 r/min, and the gas/liquid mixing ratio is 20:4.

The following are non-limiting examples of the present disclosure.

Example 1

A preparation method of a silicon-based cured foam material was provided, including the following steps:

(1) 48 parts of sodium dodecyl sulfate and 12 parts of dodecyl dimethyl betaine were weighed and dissolved in 2,000 parts of water to obtain a foaming agent solution, 225 parts of sodium silicate were weighed and dissolved in 1,500 parts of water to obtain a sodium silicate solution, and 375 parts of sodium dihydrogen phosphate were weighed and dissolved in 1,500 parts of water to obtain a sodium dihydrogen phosphate solution.

(2) The foaming agent solution, the sodium silicate solution, and the sodium dihydrogen phosphate solution were simultaneously poured into a stirrer, and then 500 parts of a fly ash were added to the stirrer to obtain a mixed solution.

(3) The mixed solution was foamed through a combination of mechanical stirring and air injection.

Example 2

A preparation method of a silicon-based cured foam material was provided, including the following steps:

(1) 27 parts of tetradecyl dimethyl benzyl ammonium chloride and 18 parts of dodecyl dimethyl betaine were weighed and dissolved in 2,000 parts of water to obtain a foaming agent solution, 225 parts of sodium silicate were weighed and dissolved in 1,500 parts of water to obtain a sodium silicate solution, and 375 parts of sodium dihydrogen phosphate were weighed and dissolved in 1,500 parts of water to obtain a sodium dihydrogen phosphate solution.

(2) The foaming agent solution, the sodium silicate solution, and the sodium dihydrogen phosphate solution were simultaneously poured into a stirrer, and then 500 parts of a fly ash were added to the stirrer to obtain a mixed solution.

(3) The mixed solution was foamed through a combination of mechanical stirring and air injection to obtain the silicon-based cured foam material.

Example 3

A preparation method of a silicon-based cured foam material was provided, including the following steps:

(1) 48 parts of sodium dodecyl sulfate and 12 parts of dodecyl dimethyl betaine were weighed and dissolved in 2,000 parts of water to obtain a foaming agent solution, 225 parts of sodium silicate were weighed and dissolved in 1,500 parts of water to obtain a sodium silicate solution, and 375 parts of sodium dihydrogen phosphate were weighed and dissolved in 1,500 parts of water to obtain a sodium dihydrogen phosphate solution.

(2) The foaming agent solution, the sodium silicate solution, and the sodium dihydrogen phosphate solution were simultaneously poured into a stirrer, and then 250 parts of nano-silica were added to the stirrer to obtain a mixed solution.

(3) The mixed solution was foamed through a combination of mechanical stirring and air injection to obtain the silicon-based cured foam material.

Example 4

A preparation method of a silicon-based cured foam material was provided, including the following steps:

(1) 48 parts of sodium dodecyl sulfate and 12 parts of dodecyl dimethyl betaine were weighed and dissolved in 2,000 parts of water to obtain a foaming agent solution, 225 parts of sodium silicate were weighed and dissolved in 1,500 parts of water to obtain a sodium silicate solution, and 375 parts of sodium dihydrogen phosphate were weighed and dissolved in 1,500 parts of water to obtain a sodium dihydrogen phosphate solution.

(2) The foaming agent solution, the sodium silicate solution, and the sodium dihydrogen phosphate solution were simultaneously poured into a stirrer, and then 500 parts of a quartz powder were added to the stirrer to obtain a mixed solution.

(3) The mixed solution was foamed through a combination of mechanical stirring and air injection.

Example 5

A preparation method of a silicon-based cured foam material was provided, including the following steps:

(1) 48 parts of sodium dodecyl sulfate and 12 parts of dodecyl dimethyl betaine were weighed and dissolved in 2,000 parts of water to obtain a foaming agent solution, 300 parts of sodium silicate were weighed and dissolved in 1,500 parts of water to obtain a sodium silicate solution, and 500 parts of sodium dihydrogen phosphate were weighed and dissolved in 1,500 parts of water to obtain a sodium dihydrogen phosphate solution.

(2) The foaming agent solution, the sodium silicate solution, and the sodium dihydrogen phosphate solution were simultaneously poured into a stirrer, and then 500 parts of a fly ash were added to the stirrer to obtain a mixed solution.

(3) The mixed solution was foamed through a combination of mechanical stirring and air injection.

Test Example 1

In order to test the foaming and foam-stabilizing performance of the silicon-based cured foam materials, the silicon-based cured foam materials prepared in Examples 1 to 5 each were poured into a measuring cylinder, and then characteristic parameters such as a foam expansion ratio, a foam half-life, and a curing time were observed.

The foam expansion ratio refers to a volume ratio of a foam to a base liquid, the foam half-life refers to a time for a half of a base liquid in a volume to be precipitated from a foam, and the curing time refers to a time for a foam poured into a measuring cylinder to become a gel system. Results are shown in Table 1.

TABLE 1

| Silicon-based cured foam materials | Foam expansion ratio | Foam half-life/h | Curing time/min |
| --- | --- | --- | --- |
| Example 1 | 30.5 | 48 | 3 |
| Example 2 | 9.5 | 48 | 1 |
| Example 3 | 15.9 | 120 | 8 |
| Example 4 | 22.2 | 72 | 5 |
| Example 5 | 26.7 | 48 | 3 |

Test Example 2

In order to test the rheological properties of the silicon-based cured foam materials, the silicon-based cured foam materials in Examples 1 to 5 were tested by a digital viscometer for viscosity values, and compared with common liquid media. Results are shown in Table 2.

TABLE 2

| Common liquids and silicon-based cured foam materials | | Viscosity/mPa · s |
| --- | --- | --- |
| Common liquids | Water | 1 |
| | Yogurt | 150 |
| Silicon-based cured foam materials | Example 1 | 500 |
| | Example 2 | 482 |
| | Example 3 | 1148 |
| | Example 4 | 390 |
| | Example 5 | 490 |

The above data show that the silicon-based cured foam materials have a high viscosity, and when used for blocking a forest fire, the silicon-based cured foam materials can be well attached to a surface of a forest vegetation to isolate oxygen and thus effectively prevent the further spread and recurrence of the forest fire.

Test Example 3

In order to verify the long-term stability of the silicon-based cured foam material, bubble changes of a water-based foam, a gel foam, and a silicon-based cured foam from an initial time point to 0.5 h after the initial time point were observed under a stereo-microscope, and an average bubble size was calculated by image analysis software.

The water-based foam: 48 parts of sodium dodecyl sulfate and 12 parts of dodecyl dimethyl betaine were dissolved in 5,000 parts of water to obtain a solution, and the solution was foamed through a combination of mechanical stirring and air injection.

The gel foam: 48 parts of sodium dodecyl sulfate and 12 parts of dodecyl dimethyl betaine were weighed and dissolved in 2,000 parts of water to obtain a foaming agent solution, 300 parts of sodium silicate were weighed and dissolved in 1,500 parts of water to obtain a sodium silicate solution, and 500 parts of sodium dihydrogen phosphate were weighed and dissolved in 1,500 parts of water to obtain a sodium dihydrogen phosphate solution. The foaming agent solution, the sodium silicate solution, and the sodium dihydrogen phosphate solution were simultaneously poured into a stirrer to obtain a mixed solution. The mixed solution was foamed through a combination of mechanical stirring and air injection.

The silicon-based cured foam: The silicon-based cured foam material prepared in Example 1.

Figure 2:
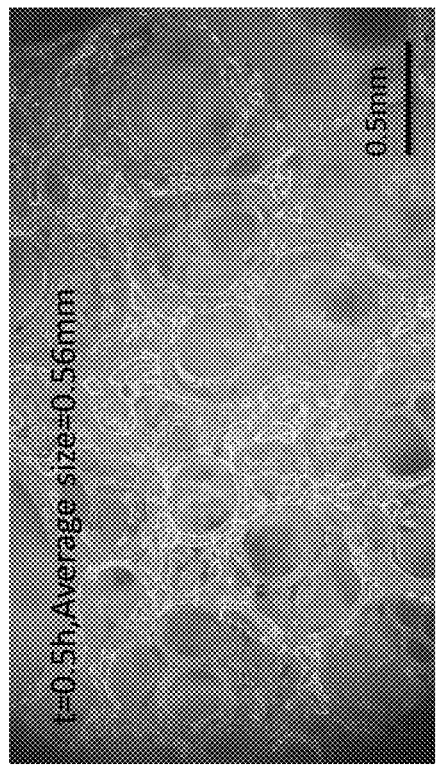
FIG. 2 shows a size change of a gel foam produced when both a foaming agent and a gelation system are added.
Figure 2:
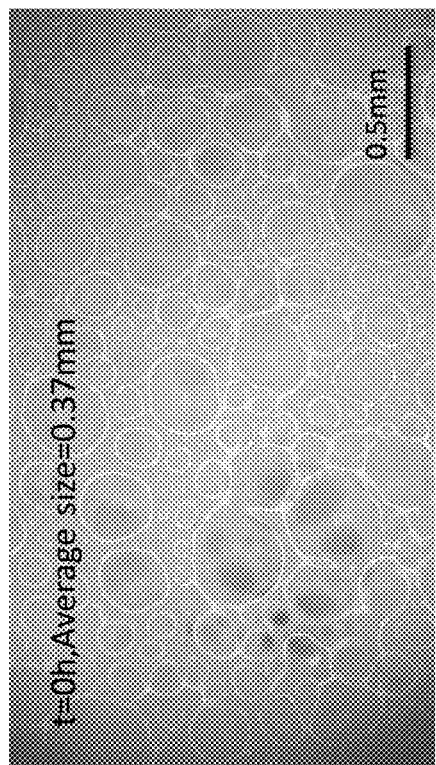
Figure 3:
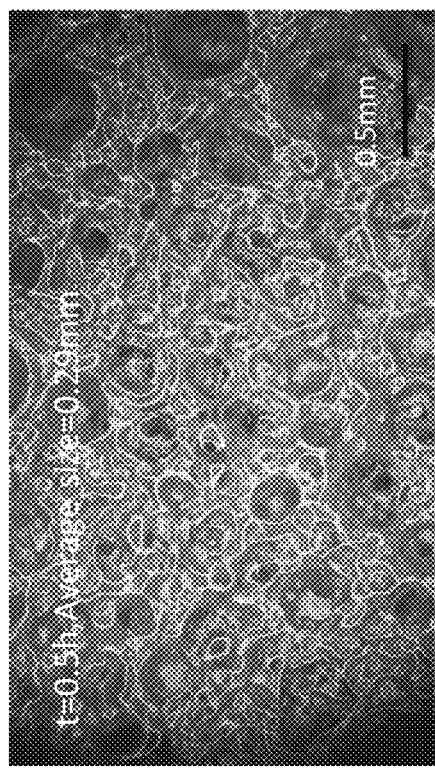
FIG. 3 shows a size change of the silicon-based cured foam material prepared in Example 1 of the present disclosure.
Figure 3:
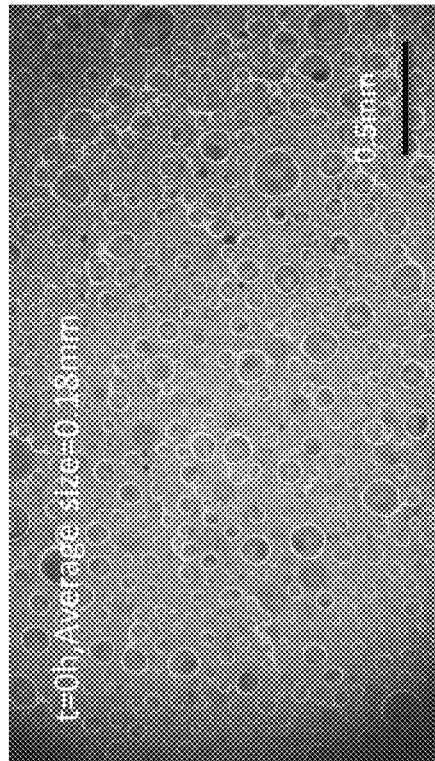

An average bubble size of the water-based foam with only a foaming agent increases from 0.4 mm at an initial time point to 1.09 mm at 0.5 h after the initial time point, as shown in FIG. 1. The gel foam with both a foaming agent and a gelation system increases from 0.37 mm to 0.56 mm, as shown in FIG. 2. The silicon-based cured foam material in Example 1 increases merely from 0.18 mm to 0.29 mm, as shown in FIG. 3, and it can be seen that the silicon-based cured foam material is cured and has excellent stability.

Test Example 4

Figure 4:
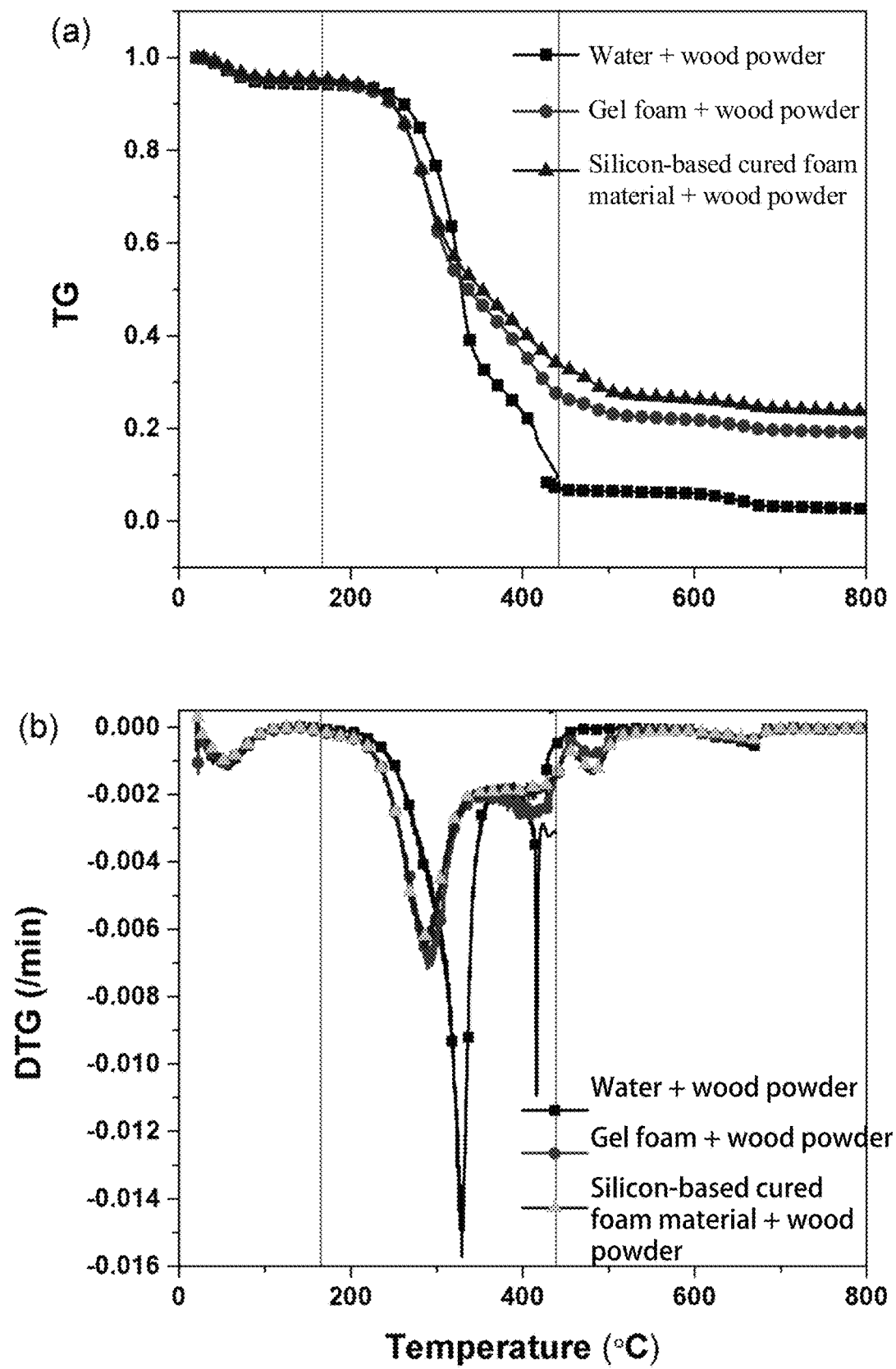
FIG. 4 shows thermogravimetric analysis data of wood powder samples treated with water, a gel foam, and a silicon-based cured foam material in equal amounts, respectively.

In order to verify the flame retardancy of the silicon-based cured foam material, three wood powder samples treated respectively with water, a gel foam (the gel foam in Test Example 3), and a silicon-based cured foam material (Example 1) in equal amounts each were subjected to thermogravimetric analysis. As shown in FIG. 4: A first stage is a crude volatilization stage of water and other volatile components. At the first stage, a wood powder sample treated with water undergoes a higher weight loss rate that the other two samples, indicating that the gel foam and the silicon-based cured foam material have a specified water-holding capacity. A second stage is an oxidation and thermal decomposition stage of hemicellulose, cellulose, and lignin in a wood powder. At the second stage, a wood powder sample treated with water undergoes a much larger peak weight loss rate than the other two samples, and a wood powder sample treated with the silicon-based cured foam material undergoes the lowest weight loss rate, indicating that the silicon-based cured foam material has excellent flame retardancy. A third stage is a combustion and decomposition stage of cokes. At the third stage, the three samples undergo similar weight loss rates. Finally, carbon residue rates of the wood powder samples treated respectively with the water, the gel foam, and the silicon-based cured foam material are 2.5%, 19.1%, and 23.3%, respectively, indicating that the silicon-based cured foam material has a significantly better inhibition effect than the gel foam and the water.

Test Example 5

Figure 12:
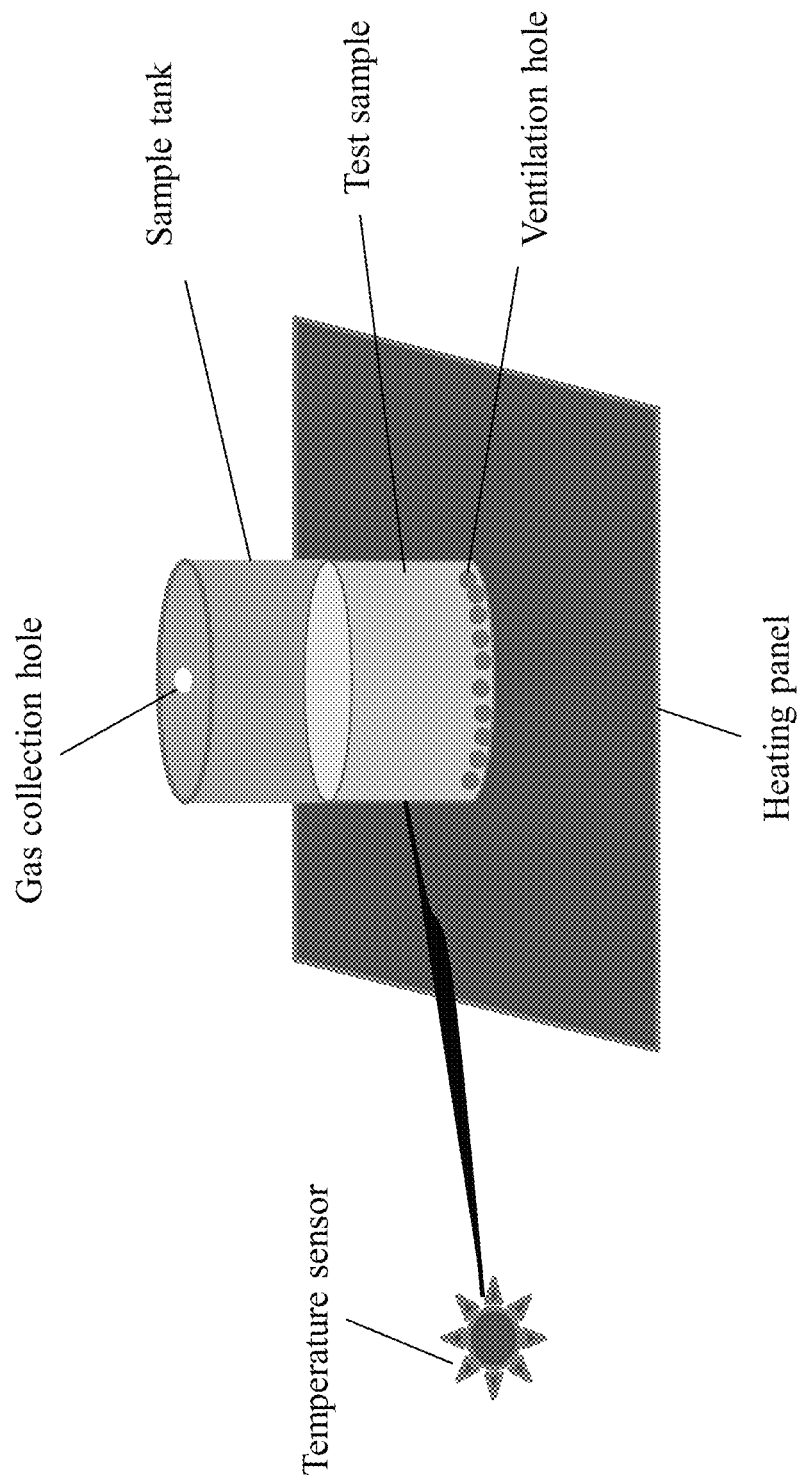
FIG. 12 is a schematic diagram of a heating test device configured to test an inhibition and cooling effect of the silicon-based cured foam material of the present disclosure.

In order to test an inhibition and cooling effect of the silicon-based cured foam materials, a heating test was conducted. A heating test device is shown in FIG. 12. A pure wood powder and a wood powder treated with water or a silicon-based cured foam material each were poured into a sample tank, and the sample tank was placed on a heating panel set to 350° C. A change law of an internal temperature of each wood powder sample over time was measured by a thermocouple temperature sensor. After the sample was heated for 25 min, 1 mL of a gas resulting from decomposition was extracted from a top of a sample tank, and a carbon monoxide content in the gas was detected by a gas chromatograph and compared with a carbon monoxide production of the pure wood powder under the same conditions. A ratio of a difference between the carbon monoxide content of the treated wood powder sample and the carbon monoxide production of the pure wood powder to the carbon monoxide production of the pure wood powder was an inhibition rate. The heating test was completed after 45 min of heating. A final temperature of each sample and an inhibition rate of each silicon-based cured foam material are shown in Table 3 below:

TABLE 3

| Test sample | | Final temperature of a sample/° C. | Inhibition rate/% |
|---|---|---|---|
| Pure wood powder | | 237 | — |
| Wood powder + water | | 229 | 62.4 |
| Wood powder + silicon-based cured foam material | Example 1 | 127 | 83.4 |
| | Example 2 | 201 | 77.3 |
| | Example 3 | 134 | 83.0 |
| | Example 4 | 197 | 75.5 |
| | Example 5 | 180 | 79.7 |

Notes: In each test sample above, the wood powder is used at an amount of 20 g, and the water and the silicon-based cured foam material each are used at an amount of 10 g.

It can be seen from the above test that the silicon-based cured foam materials exhibit excellent inhibition and cooling performance, can reduce a heating rate of a wood powder and greatly reduce a production of carbon monoxide, and have a significant inhibition effect.

Test Example 6

Figure 5:
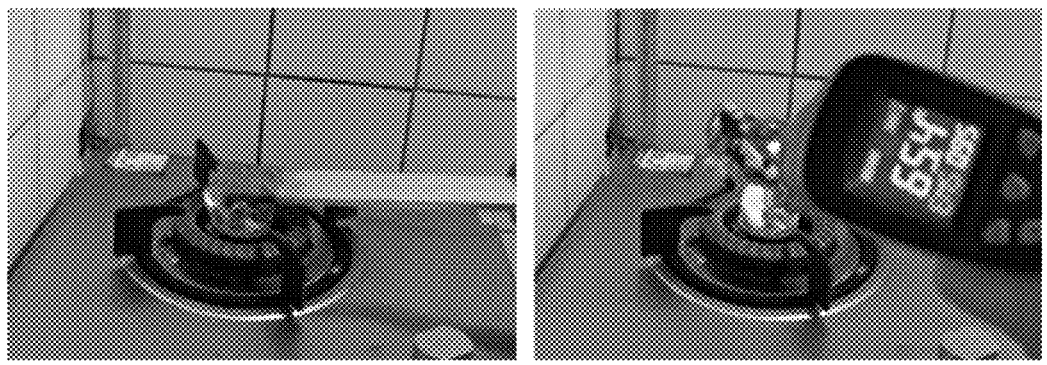
FIG. 5 shows a schematic diagram that a part of a wood strip covered with the silicon-based cured foam material prepared in Example 1 of the present disclosure is not ignited during a heating process and a schematic diagram that a temperature of a surface of the wood strip is measured immediately after the heating to be merely 65.4° C.
Figure 6:
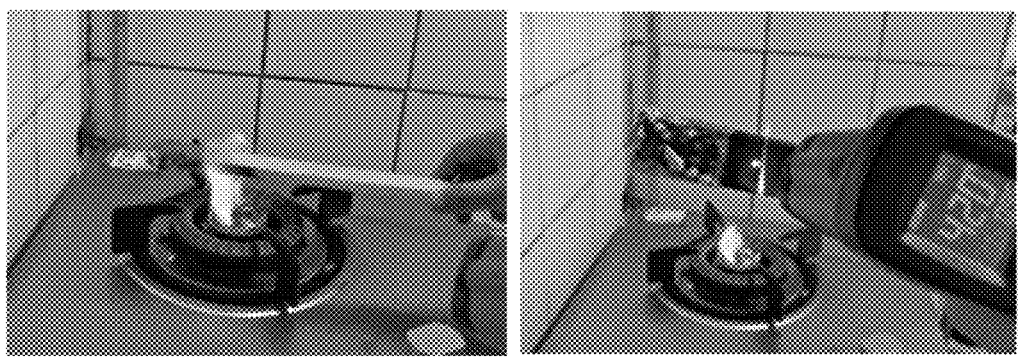
FIG. 6 is a schematic diagram that a part of a wood strip not covered with the silicon-based cured foam material of the present disclosure is ignited immediately after heating and undergoes a vigorous flame and a schematic diagram that a temperature of a surface of the wood strip is measured immediately after the ignition to be 420° C.

In order to test an actual inhibition and cooling effect of the silicon-based cured foam material, a wood strip combustion test was conducted. A top part of a wood strip was coated with the silicon-based cured foam material of the present disclosure having a formula shown in Example 1. The wood strip was burned with an ignited liquefied gas. A part of the wood strip covered with the silicon-based cured foam material of the present disclosure was not ignited. A temperature of a surface of the part of the wood strip was measured immediately after the burning to be merely 65.4° C., as shown in FIG. 5. A part of the same wood strip not covered with the silicon-based cured foam material of the present disclosure was burned. The part of the same wood strip was ignited instantaneously and underwent a vigorous flame. A temperature of a surface of the part of the wood strip was measured immediately after the burning to be 420° C., as shown in FIG. 6. The results indicate that the silicon-based cured foam material has a significant inhibition and cooling effect.

Test Example 7

Figure 7:
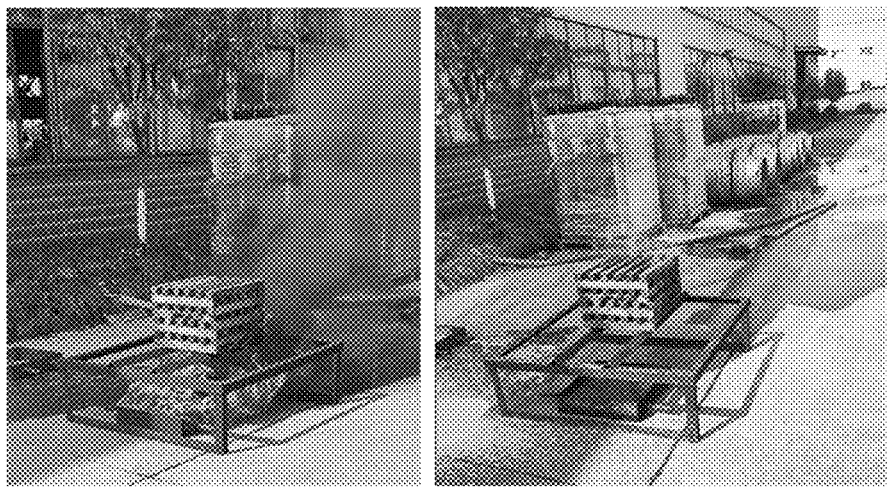
FIG. 7 shows a situation where a wood stack not covered with the silicon-based cured foam material of the present disclosure is ignited.
Figure 8:
FIG. 8 shows a situation where a wood stack covered with the silicon-based cured foam material prepared in Example 1 of the present disclosure is not ignited.

In order to test a fire-resistant and inhibition effect of the silicon-based cured foam material, a contrast wood stack ignition test was conducted. As shown in FIG. 7 and FIG. 8, two wood stacks of a same size were subjected to an ignition test, separately. For the ignition test, 1.1 L of a gasoline as an ignition fuel was adopted, and the gasoline was placed in a square gasoline tray of a fixed size. One of the two wood stacks was not treated in any way (as shown in FIG. 7), and a surface of the other one of the two wood stacks was sprayed with the silicon-based cured foam material in Example 1 (as shown in FIG. 8). It can be seen from FIG. 7 that the untreated wood stack was quickly ignited by a fire in the gasoline tray. It can be seen from FIG. 8 that the wood stack covered with the silicon-based cured foam material was not ignited after the ignition gasoline was burned out, indicating that the silicon-based cured foam material played a prominent fire-resistant and inhibition role.

Test Example 8

Figure 9:
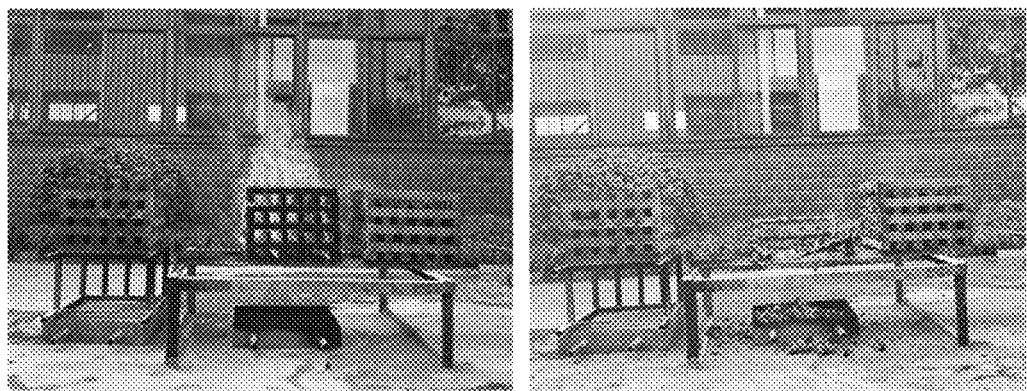
FIG. 9 shows a situation where wood stacks covered with the silicon-based cured foam material prepared in Example 1 of the present disclosure at left and right sides of a fire respectively are not ignited.

In order to test the fire resistance and burn resistance of the silicon-based cured foam material, a contrast wood stack ignition test was further conducted. As shown in FIG. 9, three wood stacks of a same size were set to conduct a fire resistance test for the material. Two wood stacks at left and right sides each were sprayed with the silicon-based cured foam material, and a wood stack in the middle was not treated in any way. An edge of a wood stack at a left side was 40 cm away from an edge of the wood stack in the middle, and an edge of a wood stack at a right side was 10 cm away from an edge of the wood stack in the middle. An ignition gasoline tray was placed directly below the wood stack in the middle, and 1.1 L of gasoline was added as an ignition fuel to the ignition gasoline tray. After the fuel in the ignition gasoline tray was ignited, the wood stack in the middle was quickly ignited. During a 40 min or more process of continuous combustion of the wood stack in the middle, the wood stack at the left side that was relatively far away from the wood stack in the middle was intact, and an edge of the wood stack at the right side that was relatively close to the wood stack in the middle was slightly charred, but was not ignited, indicating that the silicon-based cured foam material has very strong fire resistance and burn resistance.

Test Example 9

Figure 10:
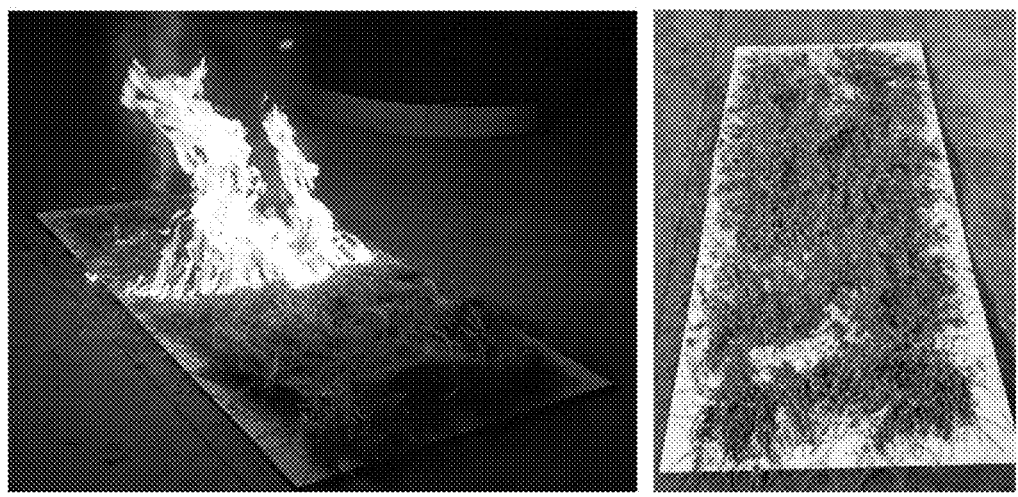
FIG. 10 shows an ignition test of pine needles not covered with the silicon-based cured foam material of the present disclosure.
Figure 11:
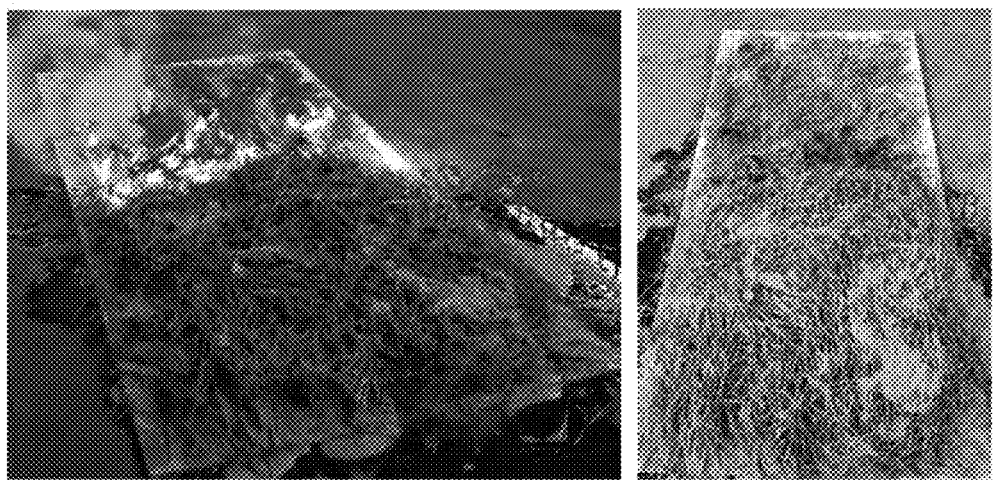
FIG. 11 shows a fire resistance test of pine needles, a half of which are covered with the silicon-based cured foam material prepared in Example 1.

In order to test the performance of the silicon-based cured foam material to block the spread of a forest fire, a forest fire spread-blocking test was conducted with pine needles as a test object. In a first experimental group, as shown in FIG. 10, 5 kg of pine needles was taken and evenly spread on a fireproof plate with a length of 2.4 m and a width of 1.2 m, and all of the pine needles were not subjected to any inhibition treatment. The pine needles were completely burned out after being ignited. In a second experimental group, as shown in FIG. 11, 5 kg of pine needles was taken and evenly spread on a fireproof plate with a length of 2.4 m and a width of 1.2 m, one half of the pine needles were covered with the silicon-based cured foam material in Example 1, and the other half of the pine needles were not treated. After the half of the pine needles that were not covered with the silicon-based cured foam material were ignited, a fire gradually spread, and when the fire spread to the half of the pine needles that were covered with the silicon-based cured foam material, the fire was gradually extinguished and did not finally ignite the half of the pine needles that were covered with the silicon-based cured foam material, indicating that the silicon-based cured foam material played a prominent fire-retardant role.

Foaming Performance Comparison

The performance of a foaming agent plays a vital role in the overall performance of a foam. The nine foaming agents of sodium dodecylbenzenesulfonate, sodium lignosulfonate, sodium dodecyl sulfate, sodium laurate, fatty alcohol polyoxyethylene ether sodium sulfate, cetyltrimethylammonium bromide, tetradecyl dimethyl benzyl ammonium chloride, dodecyl dimethyl betaine, and sorbitol were used alone for foaming and used in combination for foaming, where a mass percentage concentration of a foaming agent was 0.3%. A foaming agent was added to water, foaming was conducted by a perforated plate-hitting method, and a foam expansion ratio and a foam half-life were determined. Test results are shown in Table 4 below:

TABLE 4

| Foaming agent | Foam expansion ratio | Foam half-life (s) |
|---|---|---|
| Sodium dodecylbenzenesulfonate | 8.4 | 346 |
| Sodium lignosulfonate | 1.2 | 0 |
| Sodium dodecyl sulfate | 7.8 | 255 |
| Sodium laurate | 1.8 | 10 |
| Fatty alcohol polyoxyethylene ether sodium sulfate | 6.8 | 240 |
| Cetyltrimethylammonium bromide | 3.8 | 45 |
| Tetradecyl dimethyl benzyl ammonium chloride | 7.6 | 220 |
| Dodecyl dimethyl betaine | 6.2 | 145 |
| Sorbitol | 2.4 | 0 |
| Sodium dodecyl sulfate + dodecyl dimethyl betaine (8:2) | 9.3 | 332 |
| Sodium dodecylbenzenesulfonate + dodecyl dimethyl betaine (8:2) | 8.1 | 264 |
| Tetradecyl dimethyl benzyl ammonium chloride + dodecyl dimethyl betaine (6:4) | 9.2 | 306 |

It can be seen from Table 4 that, when the foaming agents are used alone for foaming, most of the foaming agents exhibit a low foam expansion ratio and a short foam half-life, and when any two of the foaming agents are used in combination for foaming, both a foam expansion ratio and a foam half-life are significantly improved. When sodium dodecyl sulfate and dodecyl dimethyl betaine are used in a ratio of 8:2 and tetradecyl dimethyl benzyl ammonium chloride and dodecyl dimethyl betaine are used in a ratio of 6:4, the optimal foaming and foam-stabilizing performance can be allowed.

Comparison of Performance of Coagulants

Different coagulants (sodium monohydrogen phosphate, sodium dihydrogen phosphate, sodium phosphate, and aluminum sulfate) each were used in combination with a binder (sodium silicate). In a specific experiment, a mass ratio of the binder to the coagulant was 3:5, and a gel-formation time and a gel state were determined. Experimental results are shown in Table 5 below:

TABLE 5

| Coagulant | Gel-formation time (min) | Gel state |
|---|---|---|
| Sodium monohydrogen phosphate | >24 h | No gelation |
| Sodium dihydrogen phosphate | 75 | A gel is soft and brittle |
| Sodium phosphate | >24 h | No gelation |
| Aluminum sulfate | 0 | White precipitate |

It can be seen from Table 5 that, among the four coagulants, sodium dihydrogen phosphate and aluminum sulfate have a relatively-excellent effect, and a gel-formation time can be controlled by adjusting a concentration of a coagulant. Aluminum sulfate reacts quickly, and can react immediately after being mixed with the binder, but a corresponding gel state is a white precipitate, which does not meet an actual requirement. Therefore, sodium dihydrogen phosphate is selected as the optimal coagulant.

In the present disclosure, the terms such as "one embodiment", "some embodiments", "an example", "a specific example", and "some examples" indicate that specific features, structures, materials, or characteristics described in combination with the embodiment(s) or example(s) are included in at least one embodiment or example of the present disclosure. In this specification, the schematic expression of the above terms is not necessarily directed to the same embodiment or example. Moreover, the specific features, structures, materials, or characteristics described may be combined in a suitable manner in any one or more embodiments or examples. In addition, those skilled in the art may combine different embodiments or examples described in this specification and characteristics of the different embodiments or examples without any contradiction.

Although the embodiments of the present disclosure have been illustrated and described above, it will be appreciated that the above embodiments are illustrative and should not be construed as limiting the present disclosure. Changes, modifications, substitutions, and variations can be made to the above embodiments by a person of ordinary skill in the art within the scope of the present disclosure.

What is claimed is:

1. A silicon-based cured foam material for rapidly blocking a forest fire, comprising: a binder, a foaming agent, a coagulant, an aggregate, and water, wherein when the water is in 100 parts by mass, the binder is in 4.5 parts by mass to 6 parts by mass, the foaming agent is in 0.9 part by mass to 1.2 parts by mass, and the coagulant is in 7.5 parts by mass to 10 parts by mass; a mass ratio of the aggregate to the water is 1:(10-20);

the foaming agent is a mixture of sodium dodecyl sulfate and dodecyl dimethyl betaine in a mass ratio of 8:2;
the binder is sodium silicate;
the coagulant is sodium dihydrogen phosphate;
the aggregate is at least one selected from a group consisting of a fly ash, nano-silica, and a quartz powder; and
a preparation method of the silicon-based cured foam material comprises the following steps:
(1) dissolving the foaming agent, the binder, and the coagulant separately in the water to obtain a foaming agent solution, a binder solution, and an coagulant solution, respectively;
(2) pouring the foaming agent solution, the binder solution, and the coagulant solution obtained in the step (1) into a stirrer, and adding the aggregate to the stirrer to obtain a mixed solution; and
(3) foaming the mixed solution through a combination of mechanical stirring and air injection.

2. A preparation method of the silicon-based cured foam material according to claim 1, comprising the following steps:
(1) dissolving the foaming agent, the binder, and the coagulant separately in the water to obtain a foaming agent solution, a binder solution, and an coagulant solution, respectively;
(2) pouring the foaming agent solution, the binder solution, and the coagulant solution obtained in the step (1) into a stirrer, and adding the aggregate to the stirrer to obtain a mixed solution; and
(3) foaming the mixed solution through a combination of mechanical stirring and air injection.

* * * * *